United States Patent Office 3,355,507
Patented Nov. 28, 1967

3,355,507
PREPARATION OF 1,2-DICHLORO-3,3,4,4-TETRA-FLUOROCYCLOBUTENE
Ogden R. Pierce, Midland, Mich., assignor to Dow Corning Corporation, Midland, Mich., a corporation of Michigan
No Drawing. Filed Dec. 21, 1964, Ser. No. 420,195
5 Claims. (Cl. 260—648)

This application relates to a novel method of preparing 1,2-dichloro-3,3,4,4-tetrafluorocyclobutene, which is a useful solvent, insecticide, and chemical intermediate for the production of perfluorosuccinic acid.

This method is the process comprising contacting (1) hexachlorobutadiene at a temperature of 200 to 500° C. with (2) essentially anhydrous HF in the presence of (3) a dry catalyst consisting essentially of aluminum oxide having dispersed on the surface thereof a halide of a promoter metal selected from the group consisting of metals of Groups IB, VB, VIB, VIIB and VIII of the periodic table,[1] said catalyst having been contacted before use with HF in the presence of water, whereby 1,2-dichloro-3,3,4,4-tetrafluorocyclobutene is produced.

The preferred temperature range for the process of this invention is from 350 to 450° C.

The reaction is ordinarily carried out by passing the mixed vapors of HF and hexachlorobutadiene through a bed of the above-described catalyst. The yield is usually satisfactory on one pass of the vapors, but multiple pass techniques can be used.

Ingredient (2), the essentially anhydrous hydrofluoric acid, is preferably entirely anhydrous, but up to 5 weight percent of water in the HF, based on the weight of the acid, can usually be tolerated by the reaction system without severe ill effect.

The catalyst used in this process is described in U.S. Patent No. 2,744,148, which is made a part of this application. It has been determined, however, that other metal halides besides the ones mentioned in that patent are suitable for preparing the catalysts for this invention.

The catalyst is preferably prepared by soaking porous alumina in a strong solution prepared by dissolving a halide of a metal of the above-described class in water or hydrochloric acid. This causes the metal halide to become uniformly dispersed on the surface of the alumina by absorption. Solutions of any of the halides of the aforesaid heavy metals can be used to impregnate alumina, although as a general practice, the chlorides are used. When, however, fluorides are employed, hydrofluoric acid is used to prepare a solution thereof. The impregnation procedure is controlled so that the alumina absorbs an effective proportion of the metal halide solution. Usually a sufficient amount of a metal halide is incorporated in the alumina so that the final concentration of the catalyst, expressed in terms of the promoter metal, is from 0.1 to 10 percent by weight, based on the alumina. In practice, solutions containing approximately 2 moles of metal halide per liter of solvent are commonly used to impregnate alumina.

When the alumina has been treated with the metal chloride solution, the wet impregnated material is reacted to form an aluminum basic fluoride therein. To this end, the impregnate involved can be given a preliminary treatment by passing a stream of anhydrous hydrogen fluoride over it in a suitable vessel until sensibly dry. A polytetrafluoroethylene vessel is a suitable container for the activation of small quantities of catalyst. Larger amounts of catalysts may be more conveniently activated in a rotating drum with a polytetrafluoroethylene liner.

[1] I.e., the periodic table printed by E. H. Sargent and Co. in 1963.

No heat need be applied during this initial conversion since heat is given off by reaction with hydrogen fluoride. By means of this treatment, the material gradually becomes sensibly dry. A further conversion and activation may then be carried out most conveniently in the same reaction vessel in which the organic fluorination is to be conducted. Anhydrous hydrogen fluoride is passed over the material dried according to the preceding description while the reaction vessel is slowly heated to a temperature approximating the intended reaction temperature for the organic fluorination in which the catalyst is to be used. Passage of hydrogen fluoride is preferably continued until water is no longer given off, and the initial rapid interaction with the alumina substantially ceases.

When the catalyst is prepared in this manner, it is found to contain at least 5 percent by weight of a basic aluminum fluoride, which is highly preferable. In addition to this, the catalyst will still contain aluminum oxide and/or hydroxide molecules plus the promoter metal. The catalyst also can be reacted with HF in a simple, one-step process of treatment, with or without heating, although heating from 50 to 250° C. is preferred.

The exact nature and composition of the catalyst is unknown. It is believed that a metal fluoroaluminate of some sort is formed, which compound provides the catalytic activity. It is, however, known that some aluminum oxide must remain unconverted to fluoride, although the ratio of alumina to aluminum fluoride is not critical.

The preferred metal promoter is cobalt.

The term "dry catalyst" refers only to dryness in the everyday sense, i.e. dry to the touch. It is not meant to exclude the presence of alumina hydrate.

Any metal halide of the above description can be used in this invention, e.g. cupric chloride, silver fluoride, nickel chloride, cobalt chloride, platinum iodide, hydrated platinum chloride (known as a chloroplatinic acid), ferric chloride, palladium chloride, osmium bromide manganese chloride, chromium chloride, molybdenum bromide tungsten iodide, vanadium chloride, and tantalum fluoride.

The metal halide can be added after the reaction between the alumina and HF in the presence of water, and the making of the catalyst in that manner is not intended to exclude from the claims the use of sucn a catalyst in the process of this invention.

It is preferred that the HF be reacted with the alumina in the presence of no more water than would be found in wet or damp alumina without excess, effluent water, but the reaction is operable with hydrous HF, or even by immersing the alumina in a water solution of HF, with or without heating.

The process of this invention is entirely unexpected in that a cyclic composition is produced from a linear halocarbon. The reason why this particular reaction is dominant in the presence of the above catalyst is not known.

The following examples are illustrative only and should not be construed as limiting the invention, which is properly delineated in the appended claims.

Example 1

To a water slurry of finely divided alumina there was added a saturated solution of cobalt chloride in dilute hydrochloric acid until the water effluent remained pink, indicating that the adsorption of cobalt chloride on the alumina was complete.

The excess aqueous solution was then removed by filtration, and the residue was dried, with continuous tumbling in a stream of anhydrous HF at about 120° C.

The product was packed into a nickel tube reactor and heated to 400° C.

Through this tube there was run perchlorobutadiene and anhydrous HF at the rate of 65 ml. per hour and 12 moles per hour respectively for 6 hours and 20 minutes.

The vapors from the exit end of the tube were condensed and fractionated to yield mostly a compound of the structure

which is the product of this invention.

Example 2

Similar results are obtained when cobalt chloride is replaced with nickel chloride in the experiment of Example 1.

Example 3

Similar results are obtained when cobalt chloride is replaced with cupric chloride in the experiment of Example 1 with the reaction temperature being 300° C. and the reactant rate of flow one half as great as in Example 1.

Example 4

Similar results are obtained when cobalt chloride is replaced with ferric bromide in the experiment of Example 1 with the reaction temperature being 450° C.

That which is claimed is:
1. The process comprising contacting
   (1) hexachlorobutadiene at a temperature of 200 to 500° C. with
   (2) essentially anhydrous HF in the presence of
   (3) a dry catalyst consisting essentially of aluminum oxide having dispersed on the surface thereof a halide of a promoter metal selected from the group consisting of metals of Groups IB, VB, VIB, VIIB and VIII of the periodic table, said catalyst having been contacted before use with HF in the presence of water, whereby 1,2-dichloro-3,3,4,4-tetrafluorocyclobutene is produced.
2. The process of claim 1 where the metal halide used is a metal chloride.
3. The process of claim 1 where the metal halide used is cobalt chloride.
4. The process of claim 1 where the reaction temperature of the process is from 350 to 450° C.
5. The process comprising contacting
   (1) hexachlorobutadiene at a temperature of 200 to 500° C. with
   (2) essentially anhydrous HF in the presence of
   (3) a dry catalyst consisting essentially of porous aluminum oxide, having dispersed on the surface thereof from 0.1 to 10 weight percent, based on the weight of the catalyst, of a promoter metal halide selected from the group consisting of metals of Groups IB, VB, VIB, VIIB, and VIII of the periodic table, the weight of the promoter metal only being counted, said catalyst having been contacted before use with HF in the presence of water, whereby at least 5 and less than 100 weight percent of the aluminum oxide has been converted to basic aluminum fluoride, whereby 1,2-dichloro - 3,3,4,4-tetrafluorocyclobutene is formed.

References Cited
UNITED STATES PATENTS

| | | | |
|---|---|---|---|
| 2,729,613 | 1/1956 | Miller | 260—648 |
| 2,744,148 | 5/1956 | Ruh et al. | 260—648 |
| 3,149,170 | 9/1964 | Clark et al. | 260—653.4 |

FOREIGN PATENTS
675,615  12/1963  Canada.

LEON ZITVER, *Primary Examiner.*

M. JACOB, *Assistant Examiner.*